April 9, 1968

B. R. ANKERSEN 3,377,059

ROTARY HEARTH METAL MELTING FURNACES

Filed Dec. 27, 1965

INVENTOR
Borge Richard Ankersen his attorneys

April 9, 1968 B. R. ANKERSEN 3,377,059
ROTARY HEARTH METAL MELTING FURNACES
Filed Dec. 27, 1965 3 Sheets-Sheet 2

INVENTOR
Borge Richard Ankersen

April 9, 1968

B. R. ANKERSEN 3,377,059

ROTARY HEARTH METAL MELTING FURNACES

Filed Dec. 27, 1965

INVENTOR
Borge Richard Ankersen

United States Patent Office 3,377,059
Patented Apr. 9, 1968

3,377,059
ROTARY HEARTH METAL MELTING FURNACES
Borge Richard Ankersen, 2420 Private Drive,
Lake Angelus, Pontiac, Mich. 48055
Filed Dec. 27, 1965, Ser. No. 516,490
5 Claims. (Cl. 266—33)

This invention relates to rotary hearth metal melting furnaces for melting metals and particularly to a rotary hearth furnace for melting and mixing oxidizable metal alloys and materials.

There are many industrial situations where it is desirable to melt readily oxidizable metals such as aluminum, particularly ingots and finely divided particles of such metals as for example, metal turnings, trimmings, chips, filings, and other scraps. Conventional methods of melting such metals are too slow, too costly or the losses through oxidization are too high to be economically satisfactory. For example aluminum ingots and scrap are conventionally melted in gas fired reverbatory furnaces or electric furnaces both of which are relatively slow and costly. In the reverbatory furnace the cost is greatly increased by a requirement for a great deal of manual labor for stirring and rabbling the bath and for removing dross. The electric furnace may be operated to impart mixing through flux changes but the power cost is high.

I have invented a furnace structure which overcomes these problems. By the use of my furnace, it is possible to melt aluminum or similar oxidizable metal ingots, turnings, chips, and similar fine scrap which normally suffers heavy oxidation losses without significant oxidation at a high rate of speed and without the expensive techniques heretofore proposed.

In a preferred embodiment of my invention, I provide a metal melting furnace comprising a circular hearth with upstanding sidewalls rotatable about a vertical axis and adapted to contain a molten metal bath, means for rotating said hearth about said vertical axis, a roof supported above the hearth and vertically movable with respect thereto within the upstanding sidewalls whereby the distance from roof to hearth may be selectively adjusted, an opening in the roof having a portion adjacent the axis for passing a metal charge to the hearth, radially extending plow or blade means depending from said roof adapted to extend below the roof into the metal bath to cause flow of metal radially across the bath to the center thereof, a burner in said roof spaced from said opening and directed onto the metal bath and flue means spaced from the burner means for removal of combustion gases. Preferably the plow directs the molten metal across the radius of the bath and downwardly to carry charged metal pieces below the surface while the centrifugal force of the rotating hearth causes the molten metal to move from the axis to the periphery of the hearth and up the sidewall. The plow is preferably adjustable on the roof, although it may be a permanent part of the roof structure and may be a straight blade or a blade with curvature to create a rolling action. Upstanding ribs are preferably provided on the hearth to cause rotation of the metal with the hearth.

In the foregoing general description, I have set out certain objects, advantages and purposes of my invention. Other objects, purposes and advantages will be apparent from a consideration of the following description and the accompanying drawings in which.

Figure 1:
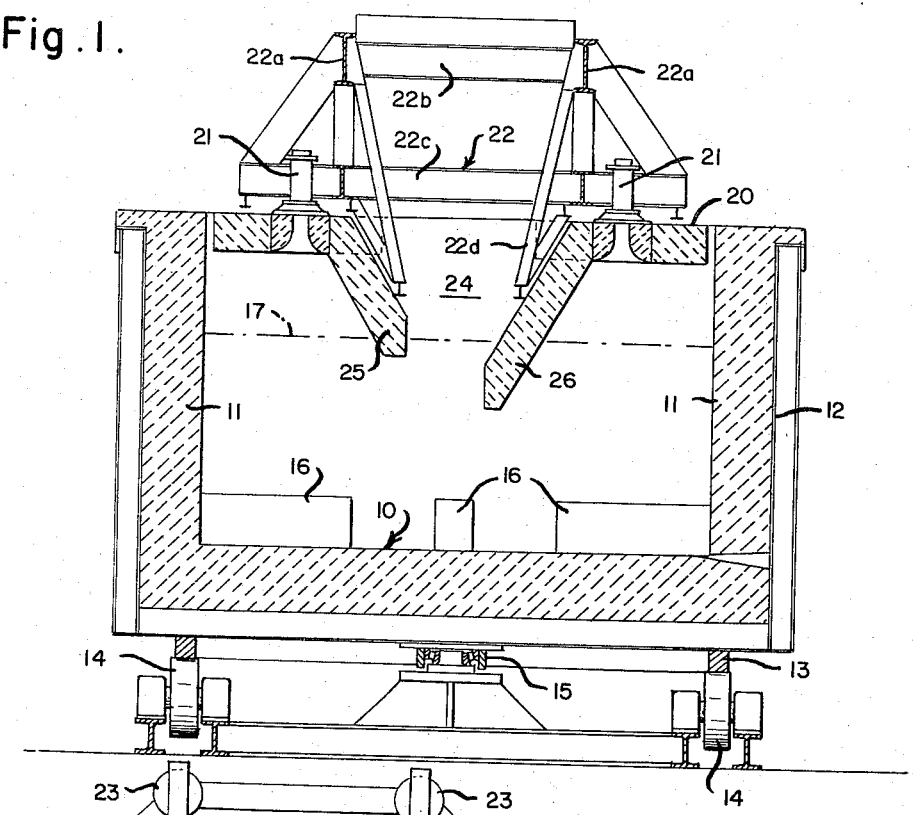
FIGURE 1 is a vertical section through a preferred form of furnace according to my invention.
Figure 2:
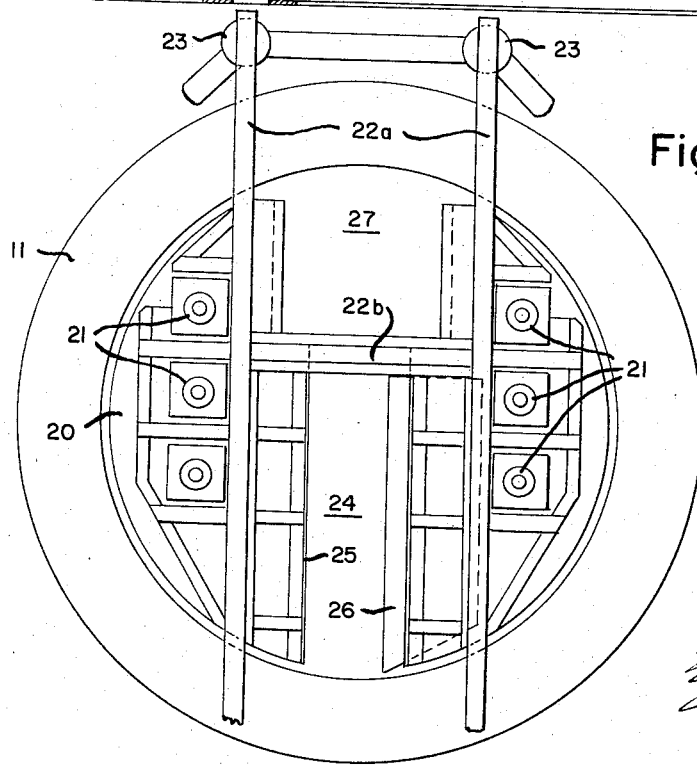
FIGURE 2 is a top plan view of the furnace of FIGURE 1.

Referring to the drawings and particularly to FIGURES 1 and 2, I have illustrated a hearth 10 having vertical upstanding sidewalls 11 all of refractory and supported in an outer steel housing 12. An annular tire 13 depends from the hearth and is supported on spaced rollers 14. The hearth rotates about an axial bearing 15. The hearth may be rotated by any well known means as for example an annular rack on the hearth driven by a pinion on an electric motor. Upstanding radial vanes 16 are provided on the hearth 10 to move the metal bath 17 with the rotating hearth.

A refractory roof 20 having burner 21 directed toward the metal bath is suspended from a roof frame 22 over the hearth. The roof frame 22 is made up preferably of spaced parallel main beams 22a connected by removable upper cross member 22b and lower cross member 22c and depending framing 22d. The opposite ends of main beams 22a are supported on vertical adjustable legs 23. The legs 23 are vertically adjustable so that the relative position of the main beams 22a may be raised and lowered relatively to the rotary hearth 10. Raising and lowering the main beams 22a raises and lowers the roof 20 with respect to the molten bath. An opening 24 extending from the center of the roof to one edge is provided in the roof structure. This opening 24 is formed with depending sloping sidewalls 25 and 26, each of which contact the molten metal bath. One of the sidewalls 26 extends substantially below the other into the body of the molten metal forming a plow extending from adjacent the axis of the hearth to the edge. A flue 27 is provided in the roof spaced from the burners.

The operation of the furnace is as follows:

The hearth 10 is rotated on rollers 14 in the counter-clockwise direction viewing FIGURE 2. Molten metal on the hearth 10 moves radially toward and up the sidewalls 11 by centrifugal force. This causes the metal to assume a dished shape, low at the axis. At the same time the plow portion 26 extending into the molten metal carries metal up the inclined surface of the plow and toward the center where it discharges downwardly into the bath. Unmelted ingots, chips, turnings and like scrap are discharged into the furnace at the axis end of opening 24 where the molten metal moving along the plow carries them beneath the surface thereby preventing oxidation and creating a thorough mixing of the metal components. The bath is continuously heated by gas burners 21 directed onto the metal surface and the residual gases of combustion withdrawn through flue 27.

It is evident from the foregoing description that a constant flowing of metal from the center of the bath outwardly by centrifugal force occurs while a return flow is created by the effect of the plow. This creates an automatic mixing action absent in all previously gas fired furnaces and, by reason of the roof construction and scrap feed method, a complete protection from excessive oxidation of the charged scrap.

Figure 3:
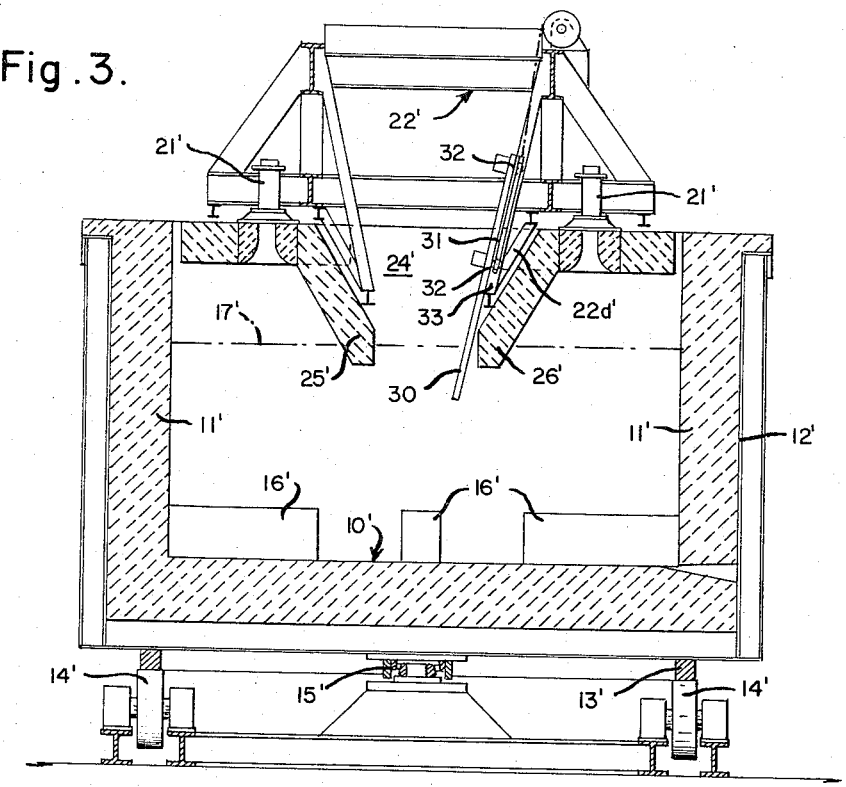
FIGURE 3 is a vertical section through a second embodiment of my invention.

The embodiment illustrated in FIGURE 3 is identical with that of FIGURES 1 and 2 except for the plow arrangement. In FIGURE 3, I have illustrated a plow 30, preferably of high alloy cast metal, mounted on frame 31 on rollers 32 moving in guideways 33 in depender framing 22d' of sloping wall 26'. The plow may be moved into and out of the molten bath to vary the flow of molten metal from the periphery of the hearth to the axis. All parts which are identical with like parts of FIGURES 1 and 2 are identified for simplicity with like numbers bearing a prime sign.

Figure 4:
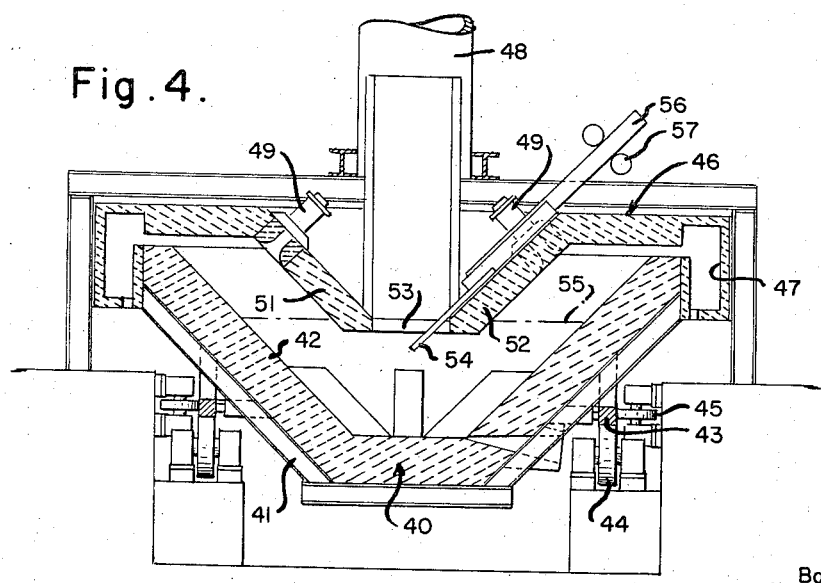
FIGURE 4 is a vertical section through a third embodiment of my invention.
Figure 5:
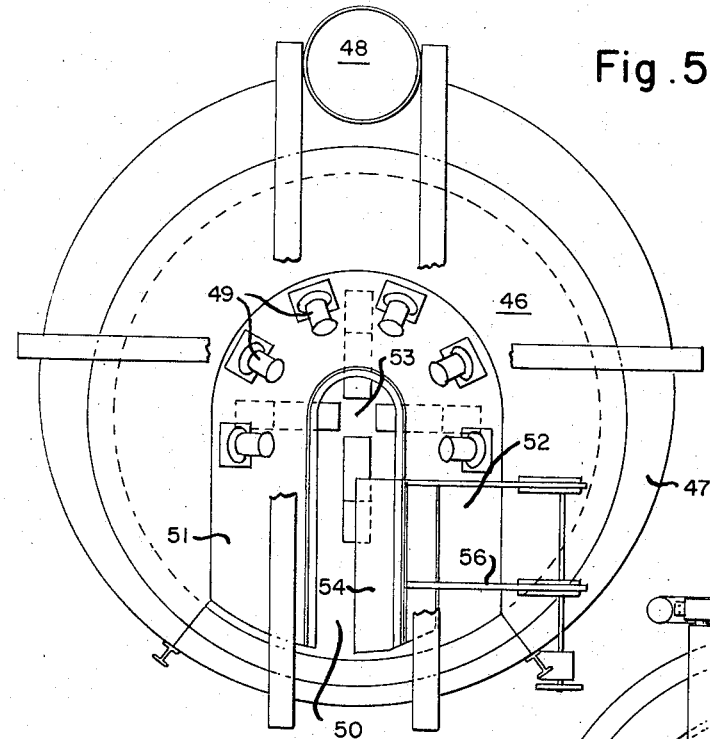
FIGURE 5 is a top plan view of the furnace of FIGURE 4.

In FIGURES 4 and 5, I have illustrated an embodiment of my invention using a truncated conical rotating hearth 40 made up of a housing 41 and refractory lining 42. A tire 43 is mounted on the sloping sidewall of the hearth 40 and rests on horizontal axis rolls 44 and against vertical axis rolls 45. The hearth 40 may be driven as in FIGURES 1 and 3. A stationary roof 46 is mounted over the hearth 40 and is provided with an annular depending peripheral flange 47 spaced from the edge of the hearth and communicating with stack 48 to remove gases from above hearth 40. Burners 49 are mounted in the roof and directed toward hearth 40. A radial slot 50 defined by sloping sidewalls 51 and 52 is provided in the roof so the sidewalls extend downwardly into contact with the molten metal. A charging well 53 is provided at the axis of the roof. Plow 54 is mounted on sloping sidewall 52 of the slot 50 for movement into and out of the bath of molten metal 55 by rack 56 and pinion 57. The operation of this embodiment is generally as described in connection with FIGURES 1–3.

Figure 7:
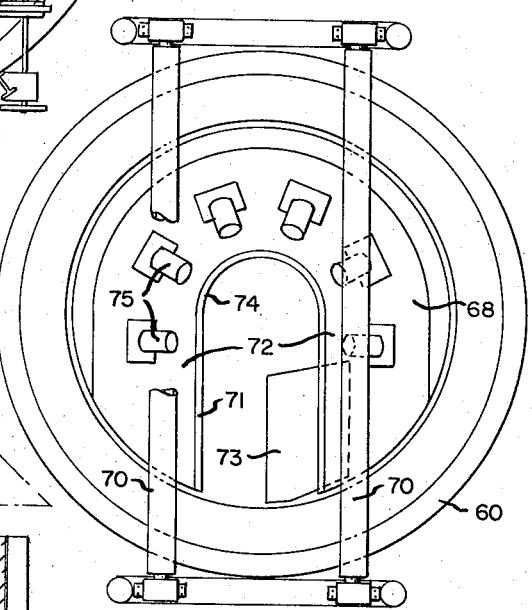
FIGURE 7 is a top plan view of the furnace of FIGURE 6.
Figure 6:
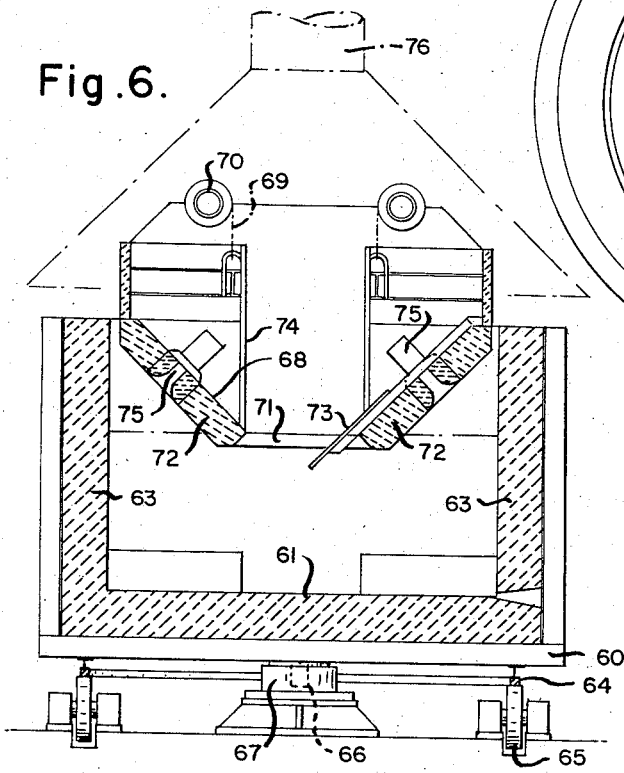
FIGURE 6 is a vertical section through a fourth embodiment of furnace according to my invention.

In the embodiment of FIGURES 6 and 7, I have illustrated still another embodiment of my invention in which hearth base 60 of metal is covered with refractory 61 and is provided with upstanding sidewalls 63 of metal and refractory. The hearth 60 is provided with an annular depending tire 64 riding on horizontal axis rollers 65 and an axial stub shaft 66 in bearing 67. This arrangement fixes and supports the hearth in its rotational path. The drive may be any well known arrangement as stated in connection with FIGURES 1–5. A roof 68 in truncated form is suspended on chains 69 from rotary shafts 70 extending parallel to one another above the hearth. Rotation of shafts 70 lowers or raises roof 68 toward or away from the hearth as the case may be. A radial slot 71 is provided in roof 68 from the axis to the periphery and is defined by depending sloping walls 72. An adjustable plow 73 is mounted on one wall 72 for movement below the metal surface to divert the metal from the periphery of the bath to the axis of the hearth. Charging chute 74 is provided in the roof at the axis thereof to introduce the metal feed into the molten metal brought by the plow and discharged into the axis of the hearth. Burners 75 are provided in the roof directed toward the hearth. An exhaust stack 76 covers the entire assembly to exhaust all gases from the assembly, which leave the furnace around the roof edge and through the slot 71, therein providing a protective atmosphere over the metal in slot 71.

In every embodiment illustrated and described above a molten pool of metal is subjected to centrifugal force to cause a radial flow, a portion of the bath is returned along the surface of the bath to the axis of the bath and discharged downwardly therein, metal scrap is fed to the axis of the bath into the moving metal and the bath is periodically tapped to remove molten metal.

It will be obvious, of course, that a pool of salt or like molten heat transfer agent could be incorporated with the molten bath to cover and protect the bath and to act as the melting agent if desired.

While I have illustrated and described certain preferred practices and embodiments of my invention in the foregoing specification, it will be understood that this invention may be otherwise embodied within the scope of the following claims.

I claim:
1. A metal melting furnace comprising a hearth with upstanding sidewalls rotatable about a vertical axis and adapted to contain a molten liquid bath, means for rotating said hearth about said vertical axis, a roof supported above the hearth and vertically movable with respect to said hearth within the upstanding sidewalls whereby the distance from roof to hearth may be selectively adjusted, an opening in said roof having a portion adjacent the axis for passing a metal charge to the hearth, radially extending blade means depending from said roof adapted to extend below the roof into the liquid bath to cause flow of molten liquid radially across the bath to the center thereof, a burner in said roof spaced from said opening and acting onto the molten bath and flue means spaced from the burner means for removal of combustion gases.

2. A metal melting furnace as claimed in claim 1 wherein the roof is independent of the hearth and seal means are provided around said opening in the roof sealingly contacting the molten bath to restrict access of air through said opening into the area beneath the roof.

3. A metal melting furnace as claimed in claim 1 wherein the hearth is circular.

4. A metal melting furnace comprising a circular hearth with upstanding sidewalls rotatable about a vertical axis and adapted to contain a molten metal bath, means for rotating said hearth about said vertical axis at a speed sufficient to create a radial flow of molten metal by centrifugal force on said hearth, a roof supported above the hearth and vertically movable with respect to said hearth within the upstanding sidewalls whereby the distance from roof to hearth may be selectively adjusted, an opening in said roof having a portion adjacent the axis for passing a metal charge to the hearth, a radially extending plow depending from said roof adapted to extend below the roof into the rotating metal bath to cause flow of metal radially across the bath to the center thereof, a burner in said roof spaced from said opening and acting onto the metal bath, flue means spaced from the burner means for removal of combustion gases and depending wall means on the roof surrounding the opening sealingly contacting the molten metal bath to restrict access of air through said opening into the area beneath the roof.

5. A metal melting furnace as claimed in claim 4 wherein the plow means extends radially from the center of the hearth at an incline to the direction of rotation and is adapted to extend below the roof into the molten metal bath to cause flow of metal upwardly onto said plow and radially across the bath to the center thereof.

References Cited

UNITED STATES PATENTS

| | | | |
|---|---|---|---|
| 2,195,092 | 3/1940 | Muller et al. | 266—34 |
| 2,845,262 | 7/1958 | Fessler | 266—34 |
| 2,875,036 | 2/1959 | Kalling | 266—34 X |
| 3,206,182 | 9/1965 | Ankersen | 266—33 |

FOREIGN PATENTS 746,197  5/1933  France.

J. SPENCER OVERHOLSER, *Primary Examiner.*

E. MAR, *Assistant Examiner.*